(12) United States Patent
Pielock et al.

(10) Patent No.: US 11,707,960 B2
(45) Date of Patent: Jul. 25, 2023

(54) AIR SUSPENSION STRUT HAVING AN ELASTIC DAMPER BEARING FASTENING

(71) Applicant: Continental Teves AG & Co. OHG, Frankfurtr am Main (DE)

(72) Inventors: Ralf Pielock, Frankfurt am Main (DE); Andreas Nessel, Frankfurt am Main (DE)

(73) Assignee: Continental Teves AG & Co. OHG, Frankfurt am Main (DE)

(*) Notice: Subject to any disclaimer, the term of this patent is extended or adjusted under 35 U.S.C. 154(b) by 183 days.

(21) Appl. No.: 17/197,884

(22) Filed: Mar. 10, 2021

(65) Prior Publication Data

US 2021/0283967 A1 Sep. 16, 2021

(30) Foreign Application Priority Data

Mar. 10, 2020 (DE) ...................... 10 2020 203 037.5

(51) Int. Cl.
 *B60G 15/14* (2006.01)
 *F16F 9/04* (2006.01)
 *F16F 9/084* (2006.01)

(52) U.S. Cl.
 CPC ............ *B60G 15/14* (2013.01); *F16F 9/0454* (2013.01); *F16F 9/084* (2013.01);
 (Continued)

(58) Field of Classification Search
 CPC ............. B60G 15/14; B60G 2203/314; B60G 2204/128; B60G 2204/1262;
 (Continued)

(56) References Cited

U.S. PATENT DOCUMENTS

| 5,150,886 A | 9/1992 | Hamberg et al. |
| 5,690,319 A * | 11/1997 | Robinson ................ F16F 9/05 267/64.19 |

(Continued)

FOREIGN PATENT DOCUMENTS

| CN | 108884898 A | 11/2018 |
| CN | 110831793 A | 2/2020 |

(Continued)

OTHER PUBLICATIONS

Office Action dated Oct. 16, 2020 from corresponding German Patent Application No. DE 10 2020 203 037.5.

(Continued)

*Primary Examiner* — Paul N Dickson
*Assistant Examiner* — Matthew D Lee

(57) ABSTRACT

An air suspension strut for a motor vehicle comprises an air spring having an air spring cover and a rolling piston. A shock damper is integrated with the air spring and has a damper tube and a piston rod receivable within the damper tube. A rolling bellows is secured between the spring cover and the rolling piston thereby delimiting a variable volume pressure chamber filled with compressed air. The rolling bellows rolls on the rolling piston with a rolling fold being formed. A damper bearing is accommodated in a bearing socket of the air spring cover and connected to the piston rod. The damper bearing comprises a supporting piece, an elastomer body, and a sleeve. A closure element inserted in the bearing socket above the damper bearing. An elastic element arranged between the sleeve and the closure element.

19 Claims, 3 Drawing Sheets

(52) U.S. Cl.
CPC .. *B60G 2202/314* (2013.01); *B60G 2204/128* (2013.01); *B60G 2204/1262* (2013.01); *B60G 2204/4502* (2013.01); *B60G 2206/424* (2013.01)

(58) Field of Classification Search
CPC ......... B60G 2204/4502; B60G 206/424; F16F 9/084; F16F 9/54
See application file for complete search history.

(56) References Cited

U.S. PATENT DOCUMENTS

| | | | | |
|---|---|---|---|---|
| 2003/0178269 | A1* | 9/2003 | Hayashi | F16F 1/3814 188/321.11 |
| 2016/0327115 | A1 | 11/2016 | Krefeld et al. | |
| 2017/0219041 | A1 | 8/2017 | Debruler et al. | |
| 2018/0009283 | A1 | 1/2018 | Pniewski et al. | |
| 2018/0370316 | A1 | 12/2018 | Priess et al. | |
| 2019/0186585 | A1* | 6/2019 | Akiyama | F16F 1/3835 |
| 2020/0039309 | A1* | 2/2020 | Pielock | B60G 11/27 |
| 2020/0139778 | A1* | 5/2020 | Pielock | B62D 21/11 |

FOREIGN PATENT DOCUMENTS

| | | | |
|---|---|---|---|
| DE | 19755549 C2 | 9/2001 | |
| DE | 102006013049 B3 | * 10/2007 | ........... B60G 15/068 |
| DE | 102007027834 A1 | 12/2008 | |
| DE | 102012012902 A1 | 1/2013 | |
| DE | 102012220204 A1 | 5/2014 | |
| DE | 102013212982 A1 | 6/2014 | |
| DE | 102014100166 A1 | 7/2015 | |
| DE | 102008034836 B4 | 5/2016 | |
| DE | 102015226044 A1 | 6/2017 | |
| DE | 102017210543 A1 | 1/2018 | |
| DE | 102018204485 A1 | 1/2019 | |
| DE | 102017202014 A1 | 8/2019 | |
| EP | 2708387 A1 | 3/2014 | |
| JP | 07253137 A | * 10/1995 | |
| KR | 101528783 B1 | 6/2015 | |

OTHER PUBLICATIONS

Chinese First Office Action dated Jul. 5, 2022 for the counterpart Chinese Patent Application No. 202110179204.6.

* cited by examiner

AIR SUSPENSION STRUT HAVING AN ELASTIC DAMPER BEARING FASTENING

CROSS-REFERENCE TO RELATED APPLICATIONS

This application claims the benefit of German Application DE 10 2020 203 037.5, filed Mar. 10, 2020. The disclosure of the above application is incorporated herein by reference.

TECHNICAL FIELD

The invention relates to an air suspension strut for a vehicle.

BACKGROUND

Air springs or air suspension struts, which are arranged between a running gear assembly and a body of a motor vehicle, are known in a large number of embodiments. The air spring comprises a rolling bellows, which is secured between a cover and a rolling piston. In operation, the air spring is subjected to an internal positive pressure, and, during spring movements, the rolling bellows rolls on the rolling piston, with a rolling fold being formed. To limit expansion, the rolling bellows is surrounded by a sleeve-shaped outer guide.

The shock damper arranged within the air spring is connected, on the one hand, to a wheel carrier and, on the other hand, via its piston rod, to a damper bearing, which is accommodated in the air spring cover. The air spring cover, in turn, is connected to the vehicle body, thus ensuring that the motor vehicle is sprung and damped. Such an air suspension strut is known from DE 10 2018 204 485 A1, for example.

In general, the damper bearing comprises a supporting disk, which is secured on the piston rod by means of a nut, wherein the supporting disk is connected air-tightly to an elastomer body and surrounded by the latter. The elastomer body as the damping element is likewise connected air-tightly to a sleeve on the outside. The damper bearing is inserted into a bearing socket formed in the core region of the air spring cover.

The damper bearing is sealed off with respect to the piston rod by means of an O-ring. Moreover, a further O-ring is provided between the bearing socket of the air spring cover and the damper bearing sleeve in order to seal off the damper bearing at this point too. Such a damper bearing is known from DE 10 2012 012 902 A1, for example.

To secure it axially, the damper bearing is covered by a closure disk. The closure disk inserted into the air spring cover is subjected to severe stresses in the axial direction by the internal pressure of the pressure chamber of the air spring and by the introduction of forces emanating from the shock damper into the damper bearing.

In the case of an air spring cover made of aluminum, the closure disk is held by a snap ring. A rectangular groove in the aluminum cover is necessary for this purpose. The sleeve of the damper bearing is held in the air spring cover by the disk with a certain downward contact pressure. The disadvantage with this is that, when assembling the air suspension strut, the disk can only be pressed by a few tenths of a millimeter of overtravel to install the snap ring.

In the case of an aluminum cover, the groove for the sealing ring is introduced by machining, and this does not cause any major problems. However, if an air spring cover made of a plastics material is used, it is necessary to work with expensive and complex internal slides. This gives rise to a disadvantageous mold parting burr, which is not permissible according to current requirements. Moreover, a rectangular groove for the sealing ring produces a large notch effect, which may lead to premature failure under normal damper bearing forces. It is therefore important to avoid such a groove in the air spring cover.

Another possibility for inserting the closure cap into the air spring cover is known from DE 10 2017 210 543 A1. Here, the closure cap is screwed into the air spring cover.

Therefore, an air suspension strut which has an improved damper bearing and in which a closure cap can be inserted easily and securely into the air spring cover of the air suspension strut is desired.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air suspension strut for a motor vehicle is provided, comprising an air spring having an integrated shock damper, wherein the air spring comprises an air spring cover and a rolling piston, wherein a rolling bellows composed of an elastomer material is secured pressure-tightly between the air spring cover and the rolling piston, thereby delimiting a volume-elastic pressure chamber filled with compressed air, and the rolling bellows rolls on the rolling piston, with a rolling fold being formed. The shock damper comprises a damper tube and a piston rod, which can dip into the damper tube, wherein the piston rod is connected to a damper bearing, which is accommodated in a bearing socket of the air spring cover, wherein the damper bearing comprises a supporting piece, an elastomer body and a sleeve, wherein a closure means is inserted into the bearing socket above the damper bearing, wherein an elastic means is arranged between the sleeve and the closure means.

The axial fastening of a damper bearing in an air spring cover of an air suspension strut. To this end, the bearing socket may be formed in a cup shape in the air spring cover. It comprises a side wall and a base. A through hole for the piston rod is provided in the base. The bearing socket is formed by the material of the air spring cover. The air spring cover is manufactured from a plastic or a metal.

The damper bearing is then inserted into the bearing socket of the air spring cover. The supporting piece is at least partially surrounded on the outside by the elastomer body, wherein the elastomer body rests at least partially against the sleeve on the inside. The elastomer body may be vulcanized to the supporting piece and the sleeve. In this case, the lower side of the elastomer body rests at least partially or in point contact on the base of the bearing socket. The sleeve is in surface contact with the side wall of the bearing socket.

The piston rod of the shock damper is then pushed through the hole and the supporting piece, and its free end is secured against the supporting piece by means of a nut. In this case, a sealing ring is used, being intended to prevent the compressed air escaping from the pressure chamber of the air spring along the piston rod.

An elastic means is now positioned between the sleeve and the closure means to be introduced. The closure means covers the damper bearing from above and is intended to hold it in the axial position. A retaining ring is provided to secure the closure means. This ring is pressed into the bearing socket to ensure that the closure means is correctly fixed. A low-cost disk made of metal is used as a closure means. A round-wire ring is used as a retaining ring.

According to one embodiment, the elastic means is configured, in operative connection with the closure means, to exert a force on the sleeve. The elastic means may be arranged between the sleeve and the closure means in the direction of a longitudinal axis of the air suspension strut.

In the assembly process, the closure means is pressed against the elastic means to enable the retaining ring to be introduced more easily into its envisaged position. In the prior art, this was not readily possible since the closure means was always pressed directly against the sleeve. As a result, there was an insufficient tolerance for the introduction of the retaining ring.

The elastic means is deformed by a few millimeters and, as soon as the retaining ring has been pressed in, the closure means is pressed back against the retaining ring. During this process, a restoring force acts in the elastic means. By virtue of its elasticity, it can be understood to be a spring. This restoring force is greater than the force which is produced on the sleeve by the movement of the damper bearing. Therefore, during static and dynamic operation of the air suspension strut, the axial forces introduced into the damper bearing by the shock damper do not act directly on the closure means but are cushioned by the elastic means.

Thus, a simpler design of the closure means can be used. For example, in the case of an air spring cover made of plastic, there is no longer a need to introduce an encircling groove for the retaining ring into the side wall of the bearing socket. As a result, the unwanted mold parting burrs are avoided.

According to another embodiment, the sleeve comprises a flange, between which the elastic means and the closure means are arranged. The flange may project radially outward. A flange is understood to mean a rim of the sleeve which is bent over by a certain angle. An enlarged contact surface of the sleeve is thereby produced. In one example, the flange is embodied so as to extend at a right angle or obliquely. Thus, the flange bends outward at 90° to the longitudinal axis of the air suspension strut. It is also possible here for the upper side thereof to extend obliquely. It extends outward either upward or downward. In this case, the upper side of the flange forms a bearing surface for the elastic means, wherein the elastic means rests at least partially against the flange. At the same time, an upper side of the elastic means rests at least partially against the closure means. The lower side of the flange rests against an annular stop of the bearing socket of the air spring cover. The flange may rest by means of its lower side against a first annular stop of the bearing socket.

In another embodiment, the sleeve comprises a rim situated opposite the flange, wherein the rim of the sleeve is spaced apart from the base of the bearing socket. A duplicated fit of the sleeve in the bearing socket is thereby avoided. Otherwise, there would be the risk that the flange would not rest correctly on its envisaged annular stop and there would be a leak between the sleeve and the side wall. The rim of the sleeve may be of chamfered design on the outside. This aids in introducing the sleeve into the bearing socket.

According to another embodiment, the elastic means is a collar formed by the elastomer body. The collar may be produced from the material of the elastomer body. In this case, the elastomer body is configured or shaped in such a way that an upper encircling rim is drawn around the flange. This gives rise to a collar which acts as an elastic means. The collar may have an upper side with an undulating or crown-shaped structure. The structure of the collar is determined by its internal damping or spring property.

An alternative embodiment envisages that the elastic means is a rubber ring. The rubber ring may be produced from a different material than the elastomer body. Instead of using the elastic means consisting of the elastomer body, a separate rubber ring is used. It is thereby possible to make a free choice of a resilient material that is appropriate to the respective use. One skilled in the art would be able to determine the appropriate choice of material for the respective use.

The rubber ring may be vulcanized or adhesively bonded to a lower side of the closure means. As an alternative, the rubber ring is vulcanized or adhesively bonded to the sleeve, e.g. to the flange of the sleeve. In order to speed up the assembly process of the closure means, the rubber ring may be connected to the closure means even before assembly. As a result, only one step needs to be performed in the assembly process.

According to another alternative embodiment, the elastic means is a Belleville spring. The Belleville spring may be produced from a metal or a plastic. An elastic Belleville spring of this kind likewise brings about a spring force and is also suitable as an elastic means. The Belleville spring may comprise an outer rim which rests against the sleeve and an inner rim which rests against the closure means. The Belleville spring can also be inserted the other way round. The decisive factor is the modulus of elasticity thereof.

The embodiments of the elastic means have in common that they are of annular design. The relevant force of the elastic means is exerted on the sleeve in the circumferential direction. The end of the piston rod can furthermore be central with respect to the elastic means, or a control line of the shock damper can be passed out of the elastic means and the closure means.

According to another embodiment, a sealing means is arranged between the sleeve and the bearing socket. For proper pressure sealing, a further sealing ring is inserted between the sleeve and the side wall to ensure that no compressed air escapes from the pressure chamber of the air spring along the contact surface thereof. The sealing means may be vulcanized or adhesively bonded to the sleeve. Here too, the assembly process is simplified by the sleeve prepared with sealing means. The bearing socket may have a second encircling annular stop, on which the sealing means is mounted. Instead of introducing a groove into the material of the bearing socket of the air spring cover in which the sealing means is accommodated, an annular stop is now used. In other words, a space for the sealing means is formed below the flange by the annular stop. As a result, there is no longer a need for a groove with a mold parting burr.

The air suspension strut is used in an air spring system of a motor vehicle. Examples of such a motor vehicle are a passenger car, a sport-utility vehicle or a light commercial vehicle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
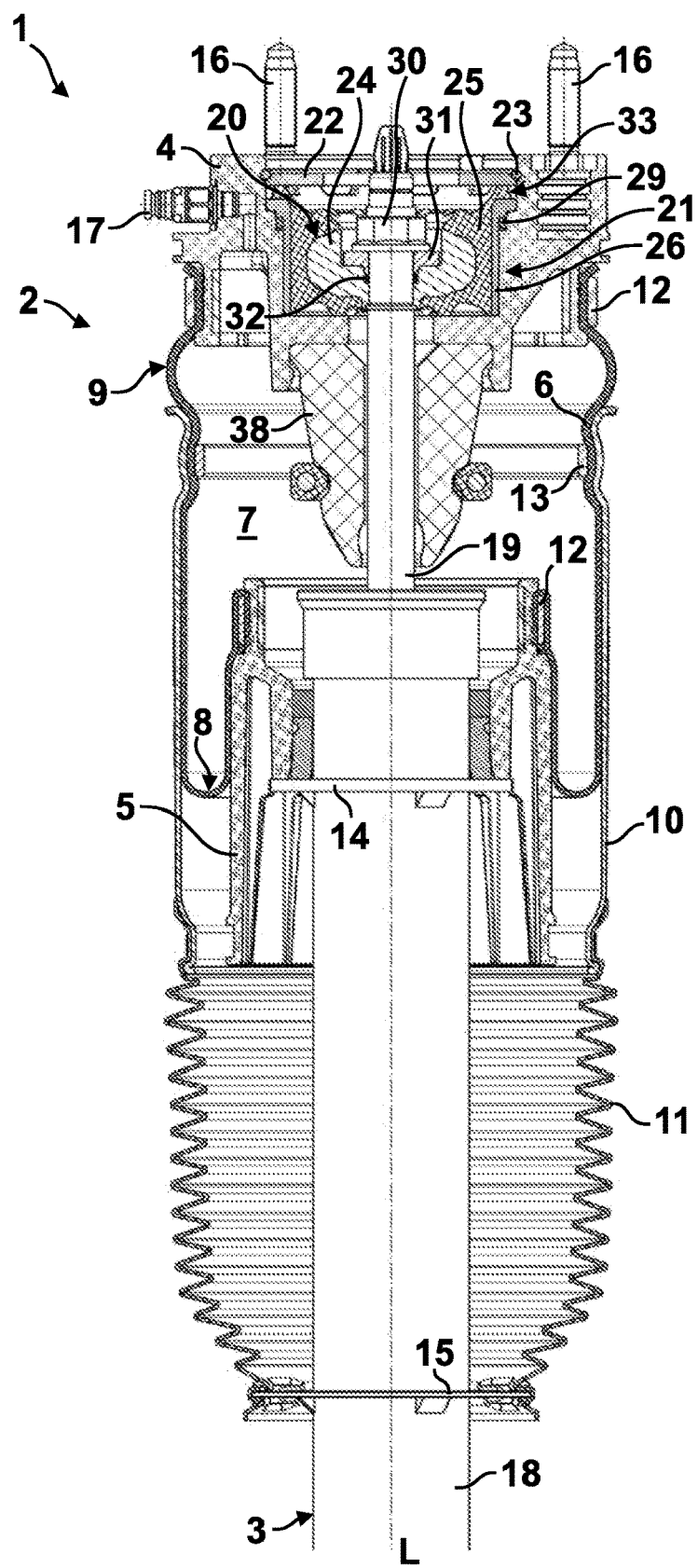
FIG. 1 shows an illustrative air suspension strut having a damper bearing and an elastic means.

FIG. 1 shows an illustrative air suspension strut 1 comprising an air spring 2 and an integrated shock damper 3, wherein air spring 2 comprises an air spring cover 4, a rolling piston 5 and a rolling bellows 6. Shock damper 3 is provided within air spring 2, shock damper 3 comprising a damper tube 18 and a piston rod 19 which can dip into the latter.

Air spring 2 comprises rolling bellows 6 of elastomer material, rolling bellows 6 delimiting, with air spring cover and rolling piston 5, a pressure-tight, variable-volume pressure chamber 7 which is filled with compressed air. For this purpose, the hose-shaped rolling bellows 6 is fastened by its upper end to the air spring cover 4 and by its lower end to the rolling piston 5, e.g. via clamping rings 12 in the connection regions of these air spring attachment parts.

In the case of relative movements along a longitudinal axis L of the air suspension strut 1 between air spring cover 4 and rolling piston 5, rolling bellows 6 rolls on the rolling surface of the rolling piston 5 with the formation of a rolling fold 8. Moreover, rolling bellows 6 forms a further fold 9 on the air spring cover 4. Fold 9 acts as a cardanic bearing. At the same time, rolling bellows 6 is provided with embedded strengthening elements. Its strengthening elements are arranged in an axial and/or crossed orientation. Moreover, an outer guide 10 surrounding at least some region or regions of the rolling bellows 6 is provided. This guide is held by a tension ring 13 applied to the inside of the rolling bellows 6.

Outer guide 10 delimits the lateral expansion of the rolling bellows 6, e.g. when said bellows is thin-walled. The pressure chamber 7 is filled via an air connection 17 on the air spring cover 4. A channel leading from the air connection 17 into the interior of air spring 2 is introduced or drilled into the air spring cover 4. Via air connection 17, air spring 2 can be filled with a certain quantity of compressed air, thereby enabling the spring force thereof to be set.

To protect against contamination of the rolling bellows 6 and especially of the rolling fold 8 thereof, a protective bellows 11 is provided. Said bellows is secured by means of its upper end on the lower end of the outer guide 10 and by means of its lower end on a fastening ring 15 on the damper tube 18. The upper end of the protective bellows 11 is secured on the outer guide 10 by positive engagement. The lower end of the protective bellows 11 is secured on the fastening ring 15 by positive engagement. For this purpose, the lower end of the protective bellows 11 is shaped in such a way that it is placed around the fastening ring 15.

Air suspension strut 1 covers two functional areas. Air spring 2 serves to produce a supporting force, while shock damper 3 is responsible for linear guidance. The motor vehicle is thereby sprung and damped. To ensure that air suspension strut 1 can be connected to a body section of a motor vehicle, a plurality of fastening means 16 is provided. These are at least partially let into air spring cover 4 and are inserted through corresponding openings in the body section and then screwed in. On the other hand, air suspension strut 1 can be connected via a damper eye (not illustrated) of the shock damper 3 to a wheel carrier of the motor vehicle. This regular installed position of the air suspension strut 1 determines the "up/down" orientation.

Rolling piston 5, which is produced from a metal or a plastic, is shaped to form a hollow cylinder and is arranged vertically on a support ring 14 of the damper tube 18. The piston rod 19, which can dip into damper tube 18, is secured by means of its upper free end on a damper bearing 20. Damper bearing 20 comprises a supporting piece 24, which is fixed on the upper end of the piston rod 19 by means of a washer 31 and a nut 30. Provided between piston rod 19 and supporting piece 24 there is furthermore an annular sealing means 32, which is additionally held in position from above by washer 31 to ensure that no compressed air escapes from pressure chamber 7 along piston rod 19. Moreover, supporting piece 24 is at least partially surrounded on the outside by an elastomer body 25.

Elastomer body 25 forms the heart of the damper bearing 20 and performs a damping function for forces emanating from the shock damper 3. Moreover, damper bearing 20 comprises a sleeve 26, which surrounds elastomer body 25 radially. Elastomer body 25 is vulcanized to supporting disk 24 on the inside and to sleeve 26 on the outside. These three elements form the damper bearing 20. Said bearing is arranged in bearing socket 21 of the air spring cover 4. In this arrangement, sleeve 26 rests against the side wall of the bearing socket 21. To ensure that no compressed air can escape from pressure chamber 7 along sleeve 26 and bearing socket 21, an annular sealing means 29 is likewise provided at this point.

Bearing socket 21 of the air spring cover 4 is of cup-shaped design and is provided in a core region of the air spring cover 4. It comprises a side wall and a base. A through hole for piston rod 19 is provided in the base of the bearing socket 21 or air spring cover 4. A stop buffer 38 is furthermore arranged below the base in order to limit the compression travel of the damper tube 18 and to reduce the forces introduced into air spring cover 4 upon stop contact. According to the example, air spring cover 4 is produced from a plastics material, e.g. a thermoplastic or a thermoset. Embodiment of the air spring cover 4 from a metal, e.g. aluminum or steel, is likewise possible.

Damper bearing 20 is held in position by a closure means 22 inserted into air spring cover 4. Closure means 22 is a metal ring which is placed in air spring cover 4. For secure fixing of closure means 22, a retaining ring 23 is inserted into bearing socket 21 from above. In the form illustrated, closure means 22 has an inner opening to enable the control line of the shock damper 3 to be passed to the outside. However, it is also possible for closure means 22 to be designed as a solid body and to be inserted pressure-tightly into air spring cover 4.

To ensure that closure means 22 can be introduced more easily in the assembly process and that a sufficient force is exerted on damper bearing 20, an elastic means 33 is provided according to the example. The arrangement, action and configurations thereof are explained in greater detail in the following FIGS. 2 to 5.

Figure 2:
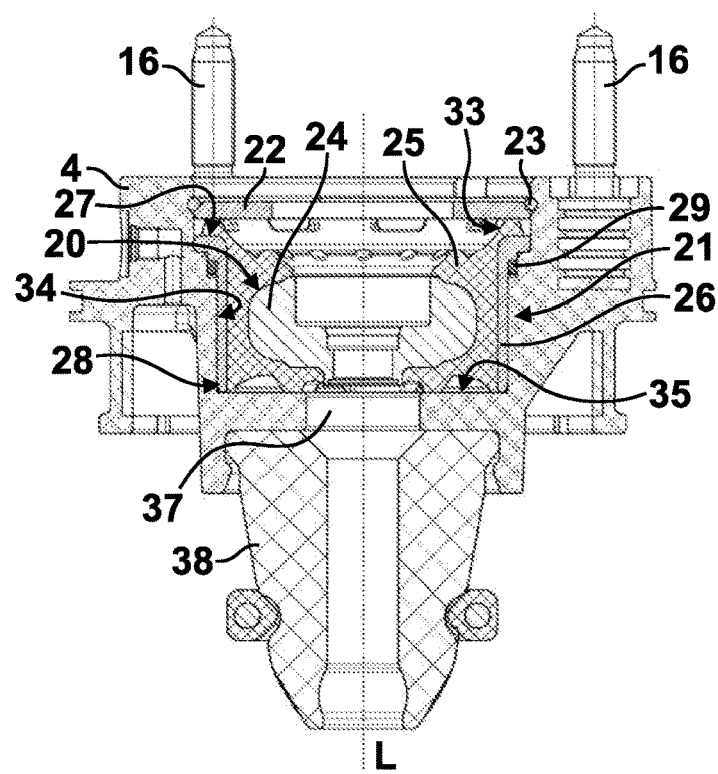
FIG. 2 shows a first exemplary embodiment of the elastic means.

FIG. 2 shows in detail a first exemplary embodiment of the elastic means 33. In the figure, only air spring cover 4 with damper bearing 20 and stop buffer 38 is shown. Air spring cover 4 comprises fastening means 16 partially let into the plastics material thereof. Bearing socket 21 is formed in the core region of the air spring cover 4. This may be cup-shaped, comprising a side wall 34 and a base 35. A through hole 37 for the piston rod of the shock damper is provided centrally in the base 35. This shaping is produced by the respective injection mold for air spring cover 4. Stop buffer 38 is arranged on the lower side of the base 35.

Damper bearing 20 is accommodated in bearing socket 21. Damper bearing 20 comprises supporting piece 24, elastomer body 25 and sleeve 26. On its inside, elastomer body 25 is vulcanized to supporting piece 24 and, on its outside, is vulcanized to sleeve 26. Elastomer body 25 performs a damping function for the forces introduced into air spring cover 4 by the shock damper and allows slight cardanic mobility of the piston rod in the air spring cover 4. For this purpose, the material of the elastomer body 25 surrounds the supporting piece 24 in such a way that supporting piece 24 is covered or surrounded radially on the outside and axially at the top and bottom by the elastomer body 25. Moreover, elastomer body 25 rests on base 35 of the bearing socket 21.

The lower side of the elastomer body 25 has an undulating or crown structure. Thus, elastomer body 25 rests only in point contact and not in surface contact on the base 35. Part of the upper side of the elastomer body 25 has a crown-like structure with hemispheres arranged in a manner distributed in the circumferential direction. The internal damping property of the elastomer body 25 is co-determined by special surface shapes. Toward sleeve 26, elastomer body 25 has a flat encircling outer wall. Sleeve 26 is produced from a plastic, e.g. a thermoplastic, or from a metal, e.g. aluminum. At the same time, supporting piece 24 is manufactured from a metal or a metal-plastic combination.

According to the example, sleeve 26 comprises a flange 27. Flange 27 is provided at the upper edge of the sleeve 26. Flange 27 points radially outward. Flange 27 is of double-stepped design on the lower side. Bearing socket 21 has a shape corresponding to sleeve 26 with flange 27. From its side wall 34, bearing socket 21 has a diameter which widens with a double step in the upward direction. Two annular stops are thereby formed. A first annular stop serves to receive the lower rim surface of the flange 27. Thus, flange 27 essentially rests on the first annular stop. By virtue of flange 27, sleeve 26 has a wide axial bearing surface, thereby ensuring better force distribution. It is thereby also possible to maintain smaller tolerance chains.

A second annular stop serves to receive the sealing means 29. This sealing means is situated under the stepped flange 27 and on the outside of sleeve 26. A certain clearance for sealing means 29 is left in the space between stepped flange 27 and the first annular stop. Therefore, there is no need to introduce a groove with a mold parting burr into the material of the air spring cover 4. Sealing means 29 is embodied as a separate part or in such a way as to be vulcanized onto sleeve 26. The first annular stop has a larger diameter than the second annular stop.

Moreover, sleeve 26 comprises a lower rim 28. Rim 28 is spaced apart from the base 35. There is a slight gap. A duplicated fit is thereby avoided. Moreover, rim 28 is of chamfered design on the outside thereof to aid introduction of sleeve 26 and hence of the damper bearing 20 into bearing socket 21.

Damper bearing 20 is covered from above by closure means 22. Closure means 22 is held in bearing socket 21 by retaining ring 23. For this purpose, a semicircular and encircling recess is introduced into the material of the air spring cover 4 in side wall 34 of the bearing socket 21, above the stepped section and above the position for the closure means 22. Retaining ring 23 is fitted into this recess. Retaining ring 23 is a round-wire ring, which is slightly elastically deformed. This can therefore be inserted into the recess. Closure means 22 is an annular disk composed of a metallic material, e.g. steel.

To ensure that closure means 22 can be introduced more easily in the assembly process and that furthermore a contact force is exerted on damper bearing 20, elastic means 33 is provided according to the example. Elastic means 33 is arranged between sleeve 26 and closure means 22. For example, elastic means 33 is arranged between sleeve 26 and closure means 22 in the longitudinal direction of the air suspension strut axis L. In detail, elastic means 33 is arranged between flange 27 of the sleeve 26 and closure means 22. On the one hand, it rests at least partially against the lower side of the closure means 22. On the other hand, elastic means 33 rests at least partially against the upper side of the flange 27.

Elastic means 33 has the property that it is elastically deformable and exerts a restoring force when subjected to a force. During the assembly process, damper bearing 20 is already in bearing socket 21 of the air spring cover 4. Elastic means 33 rests on flange 27. Closure means 22 is placed against elastic means 33 from above and pressed downward with a certain force. Up to 3 to 4 mm of elastic means 33 is thereby briefly pressed against flange 27 until retaining ring 23 snaps into the semicircular recess provided for it. The elastic means 33 then presses the closure means 22 back by about 1 to 2 mm. Closure means 22 has thereby adopted its position under the retaining ring 23. Elastic means 33 has a residual compression of about 2 to 3 mm. By forming a bearing surface for flange 27, the first annular stop furthermore serves as a counterpart for the axial compression of the elastic means 33. Pressing closure means 22 against elastic means 33 produces the restoring force, whereby, for example, damper bearing 20 is held in its axial position. This restoring force is a greater axial force than the force which is produced by the movement of the damper bearing 20 and greater than outer sleeve friction forces. As a result, the compound force resulting from closure means 22 with retaining ring 23 and elastic means 33 counteracts the static and, for example, dynamic forces introduced into damper bearing 20 by the shock damper or piston rod.

Figure 3:
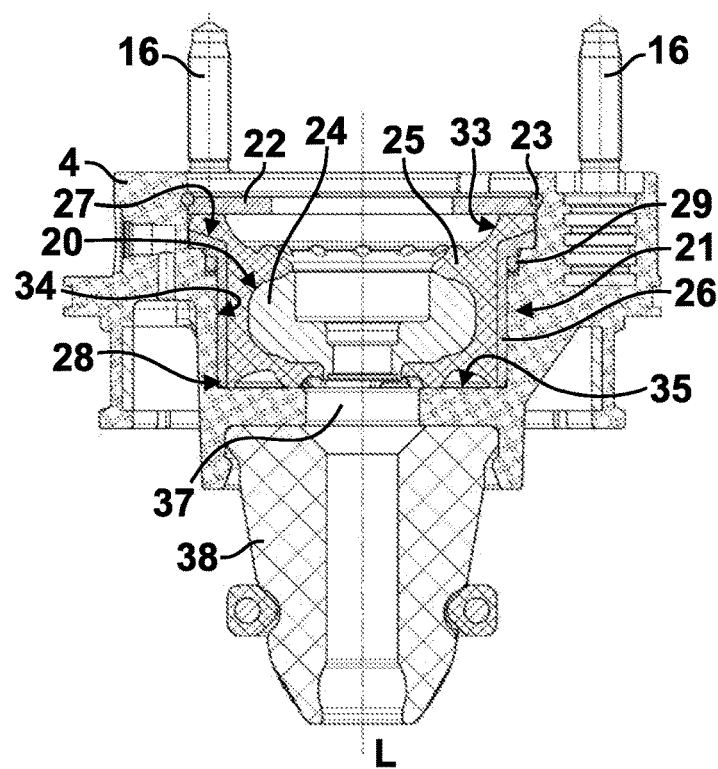
FIG. 3 shows a second exemplary embodiment of the elastic means.
Figure 4:
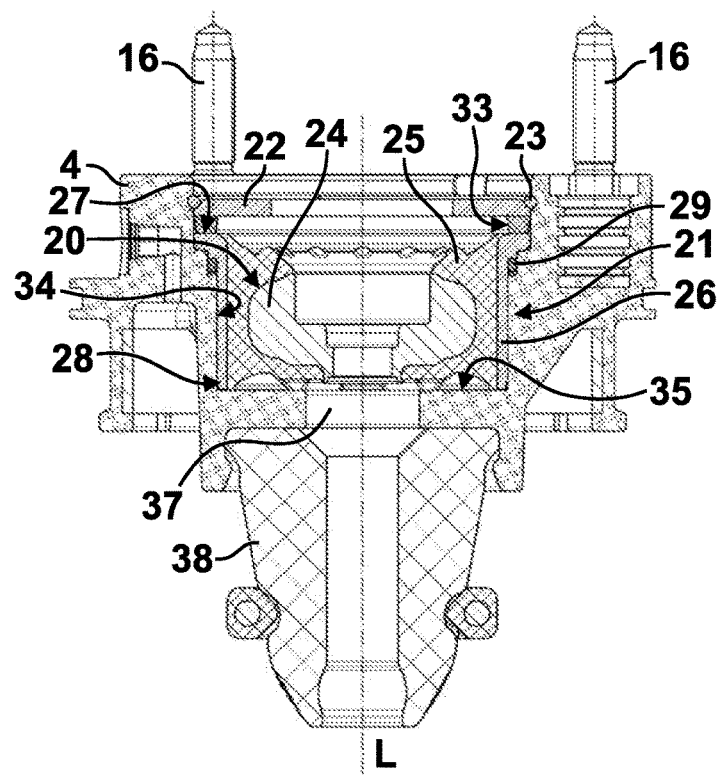
FIG. 4 shows a third exemplary embodiment of the elastic means.
Figure 5:
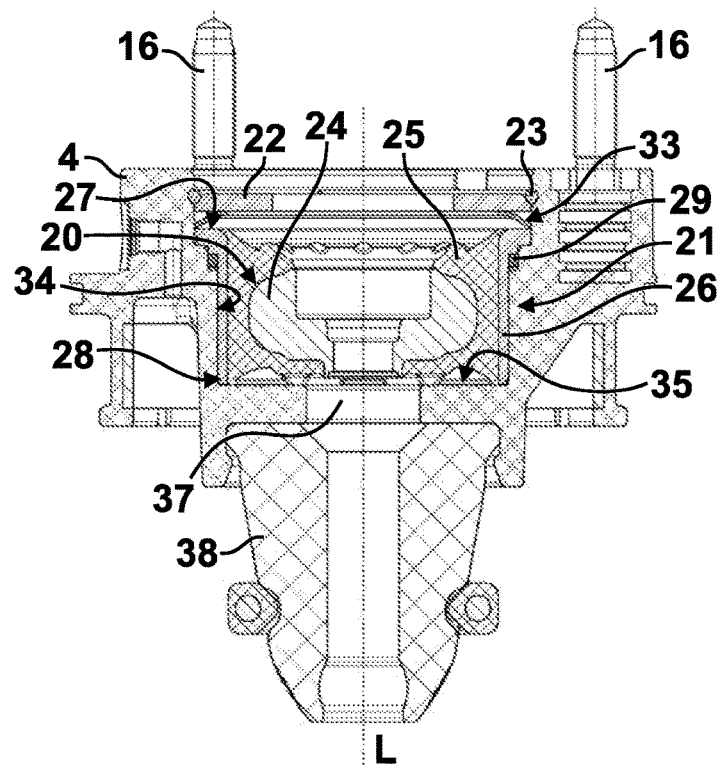
FIG. 5 shows a fourth exemplary embodiment of the elastic means.

This mode of action applies to the exemplary embodiment of the elastic means 33 shown in FIG. 2 and to the subsequent exemplary embodiments of the elastic means 33 according to FIGS. 3 to 5.

The geometry of the elastic means 33 should be matched to the axial damper loads. Thus, elastic means 33 is preferably of annular design. According to the example, elastic means 33 is designed as an encircling collar which is formed by the material of the elastomer body 25. This collar extends outward from the elastomer body 25 and rests partially on the flange 27. It appears expedient to configure and shape elastomer body 25 in such a way that it is drawn over flange 27. In this embodiment, elastic means 33 in the form of the collar consisting of the material of the elastomer body 25 is vulcanized to flange 27. The upper side of the elastic means or of the collar is of undulating or crown-shaped configuration. As a result, elastic means 33 rests against the lower side of the closure means 22 only in point contact. Other surface structures are also possible. Here too, the surface structure determines the internal damping property of the elastic means 33 and hence the restoring force thereof that can be produced. The collar can also be referred to as an encircling lip extending away from the elastomer body 25.

A second exemplary embodiment of the elastic means 33 is shown in FIG. 3. The air spring cover 4 shown does not differ from the air spring cover shown in FIG. 2. Repeated explanations are therefore omitted and attention is drawn to FIG. 2. The same reference signs are used for identical components. In respect of the mode of action of the elastic means 33 in operative connection with closure means 22 too, attention is drawn to the explanations under FIG. 2.

The second exemplary embodiment differs in the shaping of the elastic means 33 and the shaping of the flange 27 from the first exemplary embodiment. In the illustration shown, flange 27 of the sleeve 26 slopes obliquely inward. That is to say that the upper side of the flange 27 extends at an angle of less than 90° to the longitudinal axis L. The slope can also extend obliquely outward. The upper side of the flange 27 would therefore have an angle of between 90° and 180° to the longitudinal axis L. Moreover, a corrugated structure of the upper side of the flange is possible, thereby likewise making it possible to influence the restoring force of the elastic means 33.

In this exemplary embodiment, elastic means 33 is likewise formed from the material of the elastomer body 25. As a collar, elastic means 33 extends along the flange 27 as far as the side wall 34 of the bearing socket 26. The upper side of the elastic means 33 in the form of a collar rests in full surface contact against the lower side of the closure means 22. By virtue of this geometry, elastic means 33 is matched to the axial damper loads, which differ depending on the application.

FIG. 4 indicates a third exemplary embodiment of the elastic means 33, which differs from the first and second exemplary embodiments. As regards the air spring cover 4 shown and the mode of action of the elastic means 33, attention is drawn to the descriptions of FIG. 2.

Flange 27 bends radially outward at a right angle from sleeve 26. Elastic means 33 in the form of a rubber ring rests on said flange. Thus, elastic means 33 is of annular design. As the element to be compressed, elastic means 33 comprises a different material than elastomer body 25. As a result, elastic means 33 can be configured independently of the elastomer body 25. As a result, to aid in selecting the restoring force to be brought about according to the application.

A modular principle is available in one embodiment. Elastic means 33 in the form of a rubber ring is vulcanized or adhesively bonded to the lower side of the closure means 22 or to flange 27 of the sleeve 26. The assembly process may be simplified since the rubber ring is fitted in advance with closure means 22 and, for assembly, is placed on damper bearing 20 as a preassembled unit.

Elastic means 33 does not have to be embodied as a rubber ring. It may also be a ring composed of a silicone material. Other materials of similar elasticity are likewise conceivable.

Finally, FIG. 5 illustrates a third exemplary embodiment, which differs from the previous exemplary embodiments in that a Belleville spring is used as elastic means 33. The Belleville spring is manufactured from a metal or a plastic. It is annular and has the outward shape of a shallow truncated cone. The outer rim rests against the flange 27 of the sleeve 26 and is supported against side wall 34 of the bearing socket 21. The inner rim extends in a slightly flattened way and rests against the lower side of the closure means 22. When the closure means 22 is pressed down, the inner rim slopes downward and, as soon as the contact force is removed, the restoring force of the Belleville spring acts against closure means 22. Closure means 22 is thereby moved into its envisaged position, and sleeve 26 is also held fast in operation.

As regards the air spring cover 4 and other aspects of the mode of operation of the Belleville spring as an elastic means 33, attention is drawn once again to the explanations of FIG. 2.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. An air suspension strut for a motor vehicle comprising:
   an air spring having an air spring cover and a rolling piston;
   a shock damper integrated with the air spring and having a damper tube, and a piston rod receivable within the damper tube;
   a rolling bellows, composed of an elastomer material, secured pressure-tightly between the air spring cover and the rolling piston thereby delimiting a variable volume pressure chamber filled with compressed air, and wherein the rolling bellows rolls on the rolling piston with a rolling fold being formed;
   a damper bearing accommodated in a bearing socket of the air spring cover and connected to the piston rod, wherein the damper bearing comprises a supporting piece, an elastomer body, and a sleeve;
   a closure element inserted in the bearing socket above the damper bearing;
   an elastic element arranged between the sleeve and the closure element; and
   a flange of the sleeve, wherein the elastic element is arranged between the flange and the closure element.

2. The air suspension strut as claimed in claim 1, wherein the elastic element is configured, in operative connection with the closure element, to exert a force on the sleeve.

3. The air suspension strut as claimed in claim 1, wherein the flange projects radially outward.

4. The air suspension strut as claimed in claim 1, wherein a lower side of the flange rests against a first annular stop of the bearing socket.

5. The air suspension strut as claimed in claim 1, wherein the bearing socket further comprises a base, wherein the sleeve further comprises a rim situated opposite the flange, and wherein the rim of the sleeve is spaced apart from the base of the bearing socket.

6. The air suspension strut as claimed in claim 1, wherein the elastic element is a collar formed by the elastomer body.

7. The air suspension strut as claimed in claim 6, wherein the collar has an upper side with an undulating structure.

8. The air suspension strut as claimed in claim 1, wherein the elastic element is a rubber ring.

9. The air suspension strut as claimed in claim 8, wherein the rubber ring is vulcanized or adhesively bonded to one of a lower side of the closure element and the sleeve.

10. The air suspension strut as claimed in claim 1, wherein the elastic element is a Belleville spring.

11. The air suspension strut as claimed in claim 10, wherein the Belleville spring comprises an outer rim which rests against the sleeve and an inner rim which rests against the closure element.

12. The air suspension strut as claimed in claim 1, wherein the elastic element is annular.

13. The air suspension strut as claimed in claim 1, wherein a sealing element is arranged between the sleeve and the bearing socket.

14. The air suspension strut as claimed in claim 13, wherein the sealing element is vulcanized or adhesively bonded to the sleeve.

15. The air suspension strut as claimed in claim 12, wherein the bearing socket has a second encircling annular stop on which the sealing element is mounted.

16. A motor vehicle having an air suspension strut comprising:
- an air spring having an air spring cover and a rolling piston;
- a shock damper integrated with the air spring and having a damper tube, and a piston rod receivable within the damper tube;
- a rolling bellows, composed of an elastomer material, secured pressure-tightly between the air spring cover and the rolling piston thereby delimiting a volume-elastic pressure chamber filled with compressed air, and wherein the rolling bellows rolls on the rolling piston with a rolling fold being formed;
- a damper bearing accommodated in a bearing socket of the air spring cover and connected to the piston rod, wherein the damper bearing comprises a supporting piece, an elastomer body, and a sleeve;
- a closure element inserted in the bearing socket above the damper bearing;
- an elastic element arranged between the sleeve and the closure element; and
- a flange of the sleeve, wherein the elastic element is arranged between the flange and the closure element.

17. The motor vehicle as claimed in claim 16, wherein the elastic element is configured, in operative connection with the closure element, to exert a force on the sleeve.

18. The motor vehicle as claimed in claim 16, wherein the flange projects radially outward.

19. An air suspension strut for a motor vehicle comprising:
- an air spring having an air spring cover and a rolling piston;
- a shock damper integrated with the air spring and having a damper tube, and a piston rod receivable within the damper tube;
- a rolling bellows, composed of an elastomer material, secured pressure-tightly between the air spring cover and the rolling piston thereby delimiting a variable volume pressure chamber filled with compressed air, and wherein the rolling bellows rolls on the rolling piston with a rolling fold being formed;
- a damper bearing accommodated in a bearing socket of the air spring cover and connected to the piston rod, wherein the damper bearing comprises a supporting piece, an elastomer body, and a sleeve;
- a closure element inserted in the bearing socket above the damper bearing;
- an elastic element arranged between the sleeve and the closure element;
- a flange of the sleeve, wherein the elastic element is arranged between the flange and the closure element;
- a first annular stop of the bearing socket, wherein a lower side of the flange rests against stop; and
- a base of the bearing socket, wherein the sleeve further comprises a rim situated opposite the flange, and wherein the rim of the sleeve is spaced apart from the base of the bearing socket.

\* \* \* \* \*